United States Patent [19]

Nakamura et al.

[11] Patent Number: 5,658,987
[45] Date of Patent: Aug. 19, 1997

[54] RUBBER COMPOSITION

[75] Inventors: Masao Nakamura, Kawasaki; Kiyoshi Tanaka, Kumage-gun; Fumitoshi Suzuki, Yokohama, all of Japan

[73] Assignee: Nippon Zeon Co., Ltd., Tokyo, Japan

[21] Appl. No.: 525,789

[22] PCT Filed: Mar. 28, 1994

[86] PCT No.: PCT/JP94/00494

§ 371 Date: Sep. 29, 1995

§ 102(e) Date: Sep. 29, 1995

[87] PCT Pub. No.: WO94/22951

PCT Pub. Date: Oct. 13, 1994

[30] Foreign Application Priority Data

Mar. 30, 1993 [JP] Japan ................................. 5-148191

[51] Int. Cl.$^6$ .............................. C08L 9/06; C08L 53/02
[52] U.S. Cl. .............................. 525/99; 525/98; 525/914; 152/209 R
[58] Field of Search .................... 525/98, 99, 914; 152/209 R

[56] References Cited

U.S. PATENT DOCUMENTS 4,463,133  7/1984  Takeuchi et al. ..................... 525/99

FOREIGN PATENT DOCUMENTS

| | | |
|---|---|---|
| 0054440 | 6/1982 | European Pat. Off. . |
| 49-37415 | 10/1974 | Japan . |
| 57-102912 | 6/1982 | Japan . |
| 2132144 | 5/1990 | Japan . |
| 2300245 | 12/1990 | Japan . |
| 4-81437 | 3/1992 | Japan . |
| 4-21702 | 4/1992 | Japan . |
| 4227749 | 8/1992 | Japan . |
| 4-61900 | 10/1992 | Japan . |

*Primary Examiner*—Mark L. Warzel
*Attorney, Agent, or Firm*—Sherman and Shalloway

[57] ABSTRACT

The present invention provides a rubber composition which is balanced in wet skid resistance, low-temperature properties and low fuel consumption and which is suitable as a material for all-weather tire. This rubber composition comprises a random copolymer A having a glass transition temperature of −20° C. or higher, a random copolymer B having a glass transition temperature of −50° C. or lower, and a block copolymer C composed of said two copolymers as block units. The copolymers A, B and C can be produced by copolymerizing an aromatic vinyl compound and a conjugated diene using an alkali metal-based catalyst.

13 Claims, No Drawings

RUBBER COMPOSITION

TECHNICAL FIELD

The present invention relates to a rubber composition having excellent low-temperature properties.

BACKGROUND ART

As automobiles have come to have higher performances and have become more diversified, property requirements for tire have changed accordingly and a need has become high for an all-weather tire balanced in properties such as high grip, low fuel consumption, low-temperature properties in winter, and the like. Hence, it is desired to develop a rubber material balanced in such properties.

There were proposed, as such a rubber material, for example, blends of natural rubber (NR) or a polyisoprene rubber (IR) and a styrene-butadiene copolymer rubber (SBR) or a high-cis polybutadiene rubber (CBR). They, however, have inferior wet skid property and, when using a SBR of high styrene content, have low grip at low temperatures and cause cracking of tire tread portion, etc.; thus, they have no satisfactory requirements. There were also proposed blends of a polymer of high glass transition temperature (high Tg) (for example, a SBR of high styrene content) and a polymer of low Tg [for example, a high-cis polybutadiene (CBR)]. They, however, are low in tensile strength property and inferior in balance between wet skid and low-temperature properties. There were also proposed, as a polymer having properties of both a high-Tg polymer and a low-Tg polymer, block polymers composed of said two polymers as block components [e.g. Japanese Patent Publication No. 37415/1974, Japanese Patent Application Kokai (Laid-Open) No. 102912/1982, Japanese Patent Publication No. 21702/1992, Japanese Patent Publication No. 61900/1992, EP 54,440 and U.S. Pat. No. 4,463,133]. The block copolymers certainly have improved low-temperature properties, but are inferior in tensile strength and abrasion property.

DISCLOSURE OF THE INVENTION

The present inventors made an extensive study in order to develop a rubber material balanced in wet skid resistance and low-temperature properties. As a result, the present inventors found out that by blending particular two polymers having poor compatibility with each other (they cause phase separation) and a block copolymer composed of said two polymers as block components, a rubber composition can be obtained which is well balanced between low temperature properties, wet skid, abrasion property and tensile strength property. The finding has led to the completion of the present invention.

According to the present invention, there is provided a rubber composition comprising a copolymer A specified below, a copolymer B specified below and a block copolymer C composed of said copolymer A and said copolymer B as block components, all of the three copolymers being obtained by copolymerization of a conjugated diene and an aromatic vinyl compound using an alkali metal-based catalyst, in which rubber composition the copolymer A has:

(1) an aromatic vinyl compound content of 30% by weight or more, (2) a 1,2-vinyl content in conjugated diene units, of 45% by weight or more, and (3) a glass transition temperature of −20° C. or higher, and the copolymer B has:

(a) an aromatic vinyl compound content of 30% by weight or less, (b) a 1,2-vinyl content in conjugated diene units, of 20% by weight or less, and (c) a glass transition temperature of −50° C. or lower, and which rubber composition comprises:

90–50% by weight of a 20–80:80–20 (by weight ratio) mixture (I) of the copolymer A and the copolymer B, and 10–50% by weight of the block copolymer C (II).

Description is made below on the random copolymers A and B and the block copolymer C, all used in the present invention. All of these copolymers can be produced by copolymerizing a conjugated diene and an aromatic vinyl compound using an alkali metal-based catalyst.

The conjugated diene used in the present invention includes 1,3-butadiene, isoprene, 1,3-pentadiene, 2,3-dimethyl-1,3-butadiene, 1,3-hexadiene, etc. The aromatic vinyl compound includes styrene, α-methylstyrene, vinyltoluene, vinylnaphthalene, divinylbenzene, trivinylbenzene, divinylnaphthalene, etc.

The alkali metal-based catalyst used in the present invention is lithium, sodium, potassium, rubidium or cesium, or its complex with a hydrocarbon compound or a polar compound, all used in ordinary solution polymerization. The catalyst includes, for example, ethyllithium, n-butyllithium, sec-butyllithium, phenyllithium, 2-naphthyllithium, 2-butylphenyllithium, sodium naphthalene, sodium biphenyl, potassium-tetrahydrofuran complex, potassium-diethoxyethane complex and sodium salt of α-methylstyrene tetramer.

The polymerization reaction is conducted in a hydrocarbon solvent, or in a solvent causing no catalyst breakdown, such as tetrahydrofuran, tetrahydropyran, dioxane or the like. An appropriate hydrocarbon solvent is selected from aliphatic hydrocarbons, aromatic hydrocarbons and alicyclic hydrocarbons, and is preferably n-butane, isobutane, n-pentane, n-hexane, cyclohexane, 1-butene, cis-2-butene, 2-hexene, benzene, toluene, xylene, ethylbenzene or the like. These solvents can be used in admixture of two or more.

In the polymerization, in order to control the 1,2-vinyl content in conjugated diene units in the copolymers A and B, and the distribution of the aromatic vinyl monomer copolymerized with the conjugated diene monomer, in the chain of copolymer obtained, to obtain a copolymer which is as random as possible, there is used a polar compound such as ether compound (e.g. tetrahydrofuran, diethyl ether, dioxane, ethylene glycol dimethyl ether, ethylene glycol dibutyl ether or diethylene glycol dimethyl ether), amine compound (e.g. tetramethylethylenediamine, trimethylamine, triethylamine, pyridine or quinuclidine), phosphine compound (e.g. triphenylphosphine) or the like. The polymerization temperature is 0°–120° C.

After the completion of the polymerization but before the termination of the polymerization, a polyfunctional coupling agent is added to conduct coupling to prevent the produced copolymer from having a cold flow property or in view of the tensile strength property of said copolymer.

The polyfunctional coupling agent includes halogenated tin or silicon compounds such as methyltin trichloride, butyltin trichloride, tin tetrachloride, methylsilicon trichloride, butylsilicon trichloride, silicon tetrachloride and the like; diesters of dicarboxylic acids, such as diethyl adipate and the like; and so forth. Desirably, the coupling is conducted so that the proportion of the coupled copolymer molecules in the total copolymer molecules becomes at least 20% by weight. The Mooney viscosity ($ML_{1+4}$, 100° C.) of said copolymer is generally 20 or more and, when the copolymer is used as an oil-extended polymer may be 150 or more.

The block copolymer C is composed of the random copolymer A as one block (α) and the random copolymer (B) as the other block (β), and has a structure such as α-β-(α)$_n$ (n is 0 or 1), α-(β-α)$_m$ (m is an integer of 2-5), α-β-(β-α)$_p$ (p is an integer of 2-5) or the like. The Mooney viscosity of the block copolymer C is the same as mentioned above.

Said block copolymer can be produced so as to have the above-mentioned structure, by a known process for block copolymer production. It can be produced, for example, by first producing a random copolymer A by polymerization according to the above-mentioned procedure and, after the completion of the polymerization, adding a conjugated diene and an aromatic vinyl compound to the polymerization system to polymerize them and produce a random copolymer B. After the production of the random copolymer B, coupling may be conducted, as necessary, with the above-mentioned coupling agent.

The rubber composition of the present invention comprises, as rubber components, the random copolymer A, the random copolymer B and the block copolymer C. These copolymers must be copolymers which are described below, in order for the object of the present invention to be achieved.

The random copolymer A has an aromatic vinyl compound content in copolymer, of 30% by weight or more, preferably 40% by weight or more; a vinyl content in conjugated diene units, of 45% by weight or more, preferably 50% by weight or more based on the total conjugated diene units; and a glass transition temperature (Tg, measured by DSC) of −20° C. or higher. The Tg is preferably 25° C. or lower, particularly preferably −10° to 10° C. in view of the low-temperature properties of the resulting rubber composition. The upper limits of the aromatic vinyl compound content and the vinyl content are not particularly restricted as long as the Tg is in the above range, but are each preferably 90% by weight, more preferably 70% by weight.

The random copolymer B has an aromatic vinyl compound content in copolymer, of 0–30% by weight, preferably 10–20% by weight; a vinyl content in conjugated diene units, of 20% by weight or less, preferably 5–15% by weight based on the total conjugated diene units; and a glass transition temperature (Tg, measured by DSC) of −50° C. or lower. The Tg is preferably −60° to −90° C., more preferably −65° to −75° C.

The random copolymer A and the random copolymer B are incompatible with each other and cause phase separation. The block copolymer C is used so that it acts as a compatibilizer capable of reinforcing the boundary of the phases of the two random copolymers A and B. The ratio of the random copolymer A and the random copolymer B in the block copolymer C is 10–90:90–10, preferably 30–70:70–30 by weight ratio.

The rubber composition of the present invention is improved not only in balance between low-temperature properties and wet grip but also in strength property and abrasion resistance. To achieve this, it is necessary to use the random copolymer A and the random copolymer B in the weight ratio of 20–80:80–20, preferably 30–70:70–30.

The proportions of the mixture containing the random copolymer A and the random copolymer B in the above ratio and the block copolymer C are such that the former is 50–90% by weight and the latter is 50–10% by weight. When the proportions are outside the above ranges, the effects of the present invention are insufficient. Preferably, the former is 60–80% by weight and the latter is 40–20% by weight.

In the present invention, the rubber composition can be used alone, but can also be used as a blend with natural rubber or other diene type rubber such as styrene-butadiene copolymer rubber other than mentioned above (e.g. SBR obtained by emulsion polymerization), polybutadiene rubber (e.g. CBR) or the like as long as the object of the present invention is not impaired. The amount of the rubber to be blended with the present rubber composition varies depending upon the kind of said rubber and the application purpose of the resulting blend, but is generally such that the amount of the present rubber composition becomes 20% by weight or more, preferably 40% by weight or more of the blend.

Both the random copolymer A and the random copolymer B can each be used as a polymer in which the terminals of the uncoupled molecules have been coupled with an N-substituted aminoketone [e.g. 4-N,N-dimethyl aminoacetophenone, 4-N,N-dimethylaminoacetophenone, 1,3-bis(diphenylamino)-2-propane, 1,7-bis(methylethylamino)-4-heptanone, 4-N,N-dimethylaminobenzophenone, 4-N,N-di-tert-butylaminobenzophenone, 4-N,N-diphenylaminobenzophenone, 4,4'-bis(dimethylamino) benzophenone, 4,4'-bis(diethylamino)benzophenone or 4,4'-bis(diphenylamino)benzophenone] or a corresponding N-substituted aminothioketone; an N-substituted aminoaldehyde (e.g. 4-N,N-dimethylaminobenzaldehyde, 4-N,N-diphenylaminobenzaldehyde or 4-N,N-divinylaminobenzaldehyde) or its corresponding N-substituted aminothioaldehyde; a compound having, in the molecule, a —C(=M)—N< bond (M is an oxygen atom or a sulfur atom), for example, an N-substituted lactam (e.g. N-methyl-β-propiolactam, N-phenyl-βpropiolactam, N-methyl-2-pyrrolidone, N-phenyl-2-pyrrolidone, N-tert-butyl-2-pyrrolidone, N-phenyl-5-methyl-2-pyrrolidone, N-methyl-2-piperidone, N-phenyl-2-piperidone, N-methyl-ε-caprolactam, N-phenyl-ε-caprolactam, N-methyl-ω-laurylolactam or N-vinyl-ω-laurylolactam) or its corresponding N-substituted thiolactam; an N-substituted cyclic urea (e.g. N,N'-dimethylethyleneurea, 1,3-dimethylethyleneurea, 1,3-divinylethyleneurea, 1,3-diethyl-2-imidazolidinone, 1-methyl-3-ethyl-2-imidazolidinone or 1,3-dimethyl-2-imidazolidinone) or its corresponding N-substituted cyclic thiourea; or the like.

The rubber composition of the present invention is vulcanized with a vulcanizing agent, a vulcanization activator and a vulcanization accelerator by an ordinary method and is used as a vulcanizate. As the vulcanizing agent, elemental sulfur and/or a sulfur-donating compound is used. The sulfur-donating compound includes a thiuram type compound (e.g. tetramethylthiuram disulfide), a morpholine compound [e.g. 2-(4-morpholinodithio)benzothiazole], a sulfur-donating compound capable of liberating active sulfur when heated (e.g. selenium dimethyldithiocarbamate, alkylphenol disulfide or aliphatic polysulfide polymer), etc. As the vulcanization activator, stearic acid, zinc oxide, etc. can be used. As the vulcanization accelerator, there can be used a sulfenamide type compound (e.g. N-substituted 2-benzothiazylsulfenamide), a thiazole type compound, a thiuram type compound, etc. The kind and amount of the vulcanizing agent used can be appropriately determined depending upon the application purpose of the rubber composition.

The rubber composition of the present invention can comprise, depending upon its purpose and application, various compounding agents generally used in the rubber industry, such as reinforcing agent [e.g. carbon black of different grade (e.g. HAS, ISAF or N339), silica or calcium carbonate], silane coupling agent, active agent (e.g. diethylene glycol), anti-oxidant (e.g. p-phenylenediamine), process oil (e.g. aromatic type or naphthenic type), plasticizer and the like.

The rubber vulcanizate obtained by the present invention has an excellent balance between low-temperature properties, abrasion resistance property, tensile strength property, grip property, etc.; generally has a brittleness temperature of −30° C. or lower, preferably −35° C. or lower as measured by ASTM D 746; has an abrasion resistance of 130 or more, preferably 135 or more in terms of an index when the Picco abrasion amount of an styrene-butadiene copolymer rubber (styrene content=23.5%) obtained by emulsion polymerization was taken as 100; has a tensile strength of 210 kgf/cm$^2$ or more, preferably 220 kgf/cm$^2$ or more as measured by JIS K 6301; and has a tan $\delta$ at 0° C., of 0.390 or more, preferably 0.400 or more. Owing to these properties, the vulcanizate is used for applications such as tire, shoe sole, rubber vibration insulator, belt, floor material and the like, and is suitable as a material particularly for tire tread.

BEST MODE FOR CARRYING OUT THE INVENTION

The present invention is hereinafter described specifically by way of Examples. Parts in Examples and Comparative Examples are by weight unless otherwise specified.

PRODUCTION EXAMPLE 1

Random Copolymer A

Into an autoclave were fed 8 kg of cyclohexane, 225 g of styrene, 275 g of butadiene and 30 mmol of ethylene glycol dibutyl ether. Thereto was added 3.5 mmol of n-butyllithium, and polymerization was initiated at 50° C. In the course of polymerization, the same monomers of the same amounts as above were post-added continuously to continue polymerization. When the polymerization conversion became 100%, silicon tetrachloride was added to conduct coupling. After the completion of the reaction, methanol was added to terminate the reaction. Steam stripping was conducted to separate and recover a random copolymer A, followed by drying of the copolymer. The random copolymer A had a Tg of 3° C.

PRODUCTION EXAMPLE 2

Random Copolymer B

Into an autoclave were fed 8 kg of cyclohexane, 200 g of styrene, 300 g of butadiene and 0.5 mmol of ethylene glycol dibutyl ether. Thereto was added 4 mmol of n-butyllithium as an initiator, and polymerization was initiated at 70° C. In the course of polymerization, butadiene of the same amount as above was added continuously to continue polymerization until the polymerization conversion reached 100%. Then, silicon tetrachloride was added to conduct coupling. Methanol was added to terminate the reaction completely. The subsequent procedure was the same as in Production Example 1, whereby a dry copolymer B was obtained. The random copolymer B had a Tg of −72° C.

PRODUCTION EXAMPLE 3

Block Copolymers C-1 to C-5

First, a copolymer B having the same composition and molecular weight as in Production Example 2 was produced by polymerization at 70° C. When the polymerization was over, the temperature of the polymerization system was lowered to 50° C. Then, a copolymer A having the same composition and molecular weight as in Production Example 1 was produced by polymerization. When the polymerization conversion reached 100%, silicon tetrachloride was added to conduct coupling, whereby was obtained a block copolymer C-1 in which the ratio of the copolymer A block and the copolymer B block was 90/10. In similar manners, block copolymers C-2 to C-5 were obtained in which the above ratios were 70/30, 50/50, 30/70 and 10/90, respectively. The compositions of the copolymers obtained in the above Production Examples are shown in Table 1.

TABLE 1

| Composition | Kind of polymer | | | | | | |
|---|---|---|---|---|---|---|---|
| | A | B | C-1 | C-2 | C-3 | C-4 | C-5 |
| First stage | | | | | | | |
| Styrene content (%) | 45 | 20 | 20 | ← | ← | ← | ← |
| Vinyl content (%) | 60 | 10 | 10 | ← | ← | ← | ← |
| Proportion (%) | 100 | 100 | 10 | 30 | 50 | 70 | 90 |
| Second stage | | | | | | | |
| Styrene content (%) | — | — | 45 | ← | ← | ← | ← |
| Vinyl content (%) | — | — | 58 | 59 | 60 | 59 | 59 |
| Proportion (%) | — | — | 90 | 70 | 50 | 30 | 10 |
| Average molecular weight × 10$^{-4}$ | 87 | 92 | 90 | 92 | 92 | 89 | 89 |

Notes:
First stage: refers to the production stage of copolymer B block in production of each of block copolymers C-1 to C-5.
Second stage: refers to the production stage of copolymer A block in production of each of block copolymers C-1 to C-5.
Proportion: refers to the proportion of copolymer A block or copolymer B block.
Average molecular weight: refers to a weight-average molecular weight (standard polystyrene-reduced) as measured by GPC.

EXAMPLES 1–10 and COMPARATIVE EXAMPLES 1–9

Rubber compositions were prepared according to the compounding recipe shown below, wherein the rubber component was one of the polymers indicated in Tables 2–5. Each of the rubber compositions was subjected to press cure at 160° C. for 20 minutes to prepare test pieces for evaluation of each rubber composition. Tensile strength property was measured by JIS K 6301; abrasion property was measured by the use of a Picco abrasion tester; loss factor (tan $\delta$ at 0° C. and 60° C.) was measured at 10 Hz and a torsion of 0.5% strain while changing the sample temperature, by the use of a viscoelastometer (a product of Rheometrics Co., Ltd.); and brittleness temperature was measured by ASTM D 746. Incidentally, abrasion property was indicated as an abrasion resistance expressed as an index when the result of the styrene-butadiene copolymer rubber (SBR) obtained by emulsion polymerization in Comparative Example 1 was taken as 100. An abrasion resistance higher in the extend exceeding 100 means a more improved abrasion resistance. The results of the above measurements are shown in Tables 2–5.

| Compounding recipe | |
|---|---|
| Rubber component | 100 parts |
| Sulfur (325 mesh) | 2 |
| Zinc oxice # 1 | 3 |
| Stearic acid | 2 |

-continued

| Compounding recipe | |
|---|---|
| ISAF carbon black | 95 |
| Aromatic process oil | 50 |
| N-Cyclohexyl-2-benzothiazolesulfenamide | 1.5 |

TABLE 2

|  | Comparative Example 1 | Comparative Example 2 | Comparative Example 3 | Comparative Example 4 |
|---|---|---|---|---|
| Kind of polymer | 9526 (*1) | D (*2) | A | A/B (40/60) |
| Loss factor | | | | |
| 0° C. | 0.375 | 0.417 | 0.460 | 0.405 |
| 60° C. | 0.211 | 0.199 | 0.202 | 0.198 |
| Brittleness temperature (°C.) | −28 | −23 | −22 | −34 |
| Abrasion resistance (index) | 100 | 111 | 100 | 125 |
| $M_{300\%}$ (kgf/cm$^2$) (*3) | 128 | 140 | 130 | 140 |
| Tensile strength (kgf/cm$^2$) | 200 | 220 | 200 | 210 |

Notes:
(*1) A SBR obtained by emulsion polymerization, having a styrene content of 35% and a Tg of −40° C. (a product of Nippon Zeon Co., Ltd.)
(*2) A SBR prepared in the same manner as in Production Example 1, having a styrene content of 40%, a vinyl content of 25%, a weight-average molecular weight of 750,000 and a Tg of −33° C.
(*3) Refers to a 300% tensile stress. The same applies to the following tables.

TABLE 3

|  | Comparative Example 5 | Comparative Example 6 | Comparative Example 7 | Comparative Example 8 | Comparative Example 9 |
|---|---|---|---|---|---|
| Kind of polymer | C-3/A (80/20) | C-3/A (60/40) | C-3/B (60/40) | C-3/B (90/10) | C-3 |
| Loss factor | | | | | |
| 0° C. | 0.472 | 0.381 | 0.356 | 0.422 | 0.416 |
| 60° C. | 0.201 | 0.242 | 0.188 | 0.196 | 0.172 |
| Brittleness temperature (°C.) | −25 | −17 | −41 | −32 | −32 |
| Abrasion resistance (index) | 122 | 116 | 130 | 123 | 94 |
| $M_{300\%}$ (kgf/cm$^2$) | 140 | 145 | 136 | 133 | 130 |
| Tensile strength (kgf/cm$^2$) | 198 | 205 | 202 | 196 | 190 |

TABLE 4

|  | Example 1 | Example 2 | Example 3 | Example 4 | Example 5 |
|---|---|---|---|---|---|
| Kind of polymer | | | | | |
| A | 22 | 26 | 30 | 34 | 38 |
| B | 58 | 54 | 50 | 46 | 42 |
| C | 20(C-1) | 20(C-2) | 20(C-3) | 20(C-4) | 20(C-5) |
| Loss factor | | | | | |
| 0° C. | 0.399 | 0.407 | 0.417 | 0.420 | 0.411 |
| 60° C. | 0.201 | 0.199 | 0.209 | 0.202 | 0.198 |
| Brittleness temperature (°C.) | −37 | −39 | −41 | −37 | −34 |
| Abrasion resistance (index) | 130 | 147 | 135 | 140 | 130 |
| $M_{300\%}$ (kgf/cm$^2$) | 142 | 155 | 148 | 150 | 140 |
| Tensile strength (kgf/cm$^2$) | 210 | 215 | 220 | 210 | 210 |

TABLE 5

|  | Example 6 | Example 7 | Example 8 | Example 9 | Example 10 |
|---|---|---|---|---|---|
| Kind of polymer | | | | | |
| A | 25 | 20 | 15 | 19 | 12 |
| B | 55 | 40 | 35 | 51 | 48 |
| C | 30(C-3) | 40(C-3) | 50(C-3) | 30(C-2) | 40(C-2) |
| Loss factor | | | | | |
| 0° C. | 0.438 | 0.443 | 0.461 | 0.426 | 0.433 |
| 60° C. | 0.211 | 0.208 | 0.215 | 0.198 | 0.203 |
| Brittleness temperature (°C.) | −41 | −43 | −44 | −40 | −39 |
| Abrasion resistance (index) | 141 | 139 | 130 | 136 | 130 |
| $M_{300\%}$ (kgf/cm$^2$) | 158 | 155 | 140 | 150 | 143 |
| Tensile strength (kgf/cm$^2$) | 235 | 228 | 210 | 225 | 210 |

As is clear from the results of Tables 2, 4 and 5, the rubber compositions of the above Examples, as compared with those of Comparative Examples 1–3, have brittleness temperatures of −34° C. or lower and are superior particularly in low-temperature properties; have loss factors (tand δ) at 0° C., of 0.399 or more and abrasion resistances of 130 or more and are high in both grip property and abrasion resistance; thus, have balanced properties. The rubber compositions of the Examples, as compared with that of Comparative Example 4 (containing no block copolymer C), are superior in abrasion resistance. Particularly when there are used block copolymers C (C-2, C-3 and C-4) wherein the ratio of random copolymer A and random copolymer B is 30–70:70–30, the resulting rubber compositions (Examples 1–4 and 6–10) give brittleness temperatures of −37° C. or lower; the rubber compositions of Examples 2, 3 and 6–10, in particular, give brittleness temperatures of −39° C. or lower which are lower by 5° C. or more than the brittleness temperature of Comparative Example 4; in addition, these rubber compositions have significantly high abrasion resistances.

Table 3 shows the results of a block copolymer C alone or its blends with a random copolymer A or B. According to Table 3, the block copolymer C alone (Comparative Example 9) has improved low-temperature properties but is inferior in abrasion resistance and tensile strength property; and the blends have poorly balanced in properties, that is, Comparative Examples 5 and 6 are inferior in low-temperature properties and abrasion resistance, Comparative Example 7 is inferior in grip property (small loss factor at 0° C.) and tensile strength property, and Comparative Example 8 is inferior in abrasion resistance and tensile strength property.

EXAMPLE 11

A rubber composition was prepared in the same manner as in Example 1 except that the rubber component used in Example 1 was changed to a mixture consisting of 50 parts of the Comparative Example 1 polymer (SBR obtained by emulsion polymerization) shown in Table 2 and 50 parts of the Example 2 rubber composition shown in Table 4, and was measured for properties in the same manner as in Example 1. The rubber composition was about equal to that of Comparative Example 4 in loss factors (of viscoelasticity) at 0° C. and 60° C., but was significantly improved in brittleness temperature, abrasion resistance and tensile strength property as compared with Comparative Example 4.

INDUSTRIAL APPLICABILITY

The rubber composition of the present invention, which is a blend of a random copolymer A, a random copolymer B (each having a particular composition) and a block copolymer C composed of said copolymers A and B as block components, is superior in low-temperature properties, abrasion resistance and tensile strength property, and can be used for applications such as tire, shoe sole, rubber vibration insulator, belt and floor material and the like. The rubber composition, being superior in grip property (large tan δ at 0° C.) particularly on wet roads and also in low fuel consumption (small tand δ at 60° C.), is suitable as a material for tire tread, particularly all-weather tire tread.

We claim:

1. A rubber composition comprising:
   a random copolymer A obtained by copolymerization of a conjugated diene and an aromatic vinyl compound using an alkali metal-based catalyst, said random copolymer A having
   (1) an aromatic vinyl compound content of 30% by weight or more,
   (2) a 1,2-vinyl content in conjugated diene units of 45% by weight or more, and
   (3) a glass transition temperature of −20° C. or higher;
   a random copolymer B obtained by copolymerization of a conjugated diene and an aromatic vinyl compound using an alkali metal-based catalyst, said random copolymer B having
   (a) an aromatic vinyl compound content of 30% by weight or less,
   (b) a 1,2-vinyl content in conjugated diene units of 20% by weight or less, and
   (c) a glass transition temperature of −50° C. or lower; and
   a block copolymer C composed of random copolymer segment A and random copolymer segment B obtained by block copolymerization of a conjugated diene and an aromatic vinyl compound using an alkali metal-based catalyst, said random copolymer segment A having
   an aromatic vinyl compound content of 30% by weight or more, a 1,2-vinyl content in conjugated diene units of 45% by weight or more, and
   a glass transition temperature of −20° C. or higher,
   said random copolymer segment B having
   an aromatic vinyl compound content of 30% by weight or less, a 1,2-vinyl content in conjugated diene units of 20% by weight or less, and
   a glass transition temperature of −50° C. or lower;
   wherein said rubber composition comprises:
   90–50% by weight of a 20–80:80–20 mixture (I), by weight ratio, of said random copolymer A and said random copolymer B, and
   10–50% by weight of said block copolymer C (II).

2. A rubber composition according to claim 1, wherein at least one of the random copolymer A, the random copolymer B and the block copolymer C is coupled with a polyfunctional coupling agent.

3. A rubber composition according to claim 2 or 1, wherein the random copolymer A has an aromatic vinyl compound content of 40–90% by weight and a 1,2-vinyl content of 50–90% by weight.

4. A rubber composition according to claim 2 or 1, wherein the random copolymer B has an aromatic vinyl compound content of 10–20% by weight and a 1,2-vinyl content of 5–15% by weight.

5. A rubber composition according to claim 2 or 1, wherein the random copolymer A has a glass transition temperature of −10° to 10° C. and the random copolymer B has a glass transition temperature of −60° to −90° C.

6. A rubber composition according to claim 1, wherein the weight ratio of random copolymer segment A and random segment copolymer B in block copolymer C is 10–90:90–10.

7. A rubber composition according to claim 1, wherein the mixing ratio of copolymer A and copolymer B is 30–70:70–30.

8. A rubber composition according to claim 1, which comprises 70–30% by weight of (I) and 30–70% by weight of (II).

9. A rubber composition according to claim 3, wherein the random copolymer B has an aromatic vinyl compound content of 10–20% by weight and a 1,2-vinyl content of 5–15% by weight.

10. A rubber composition according to claim 3, wherein the random copolymer A has a glass transition temperature of −10° to 10° C. and the random copolymer B has a glass transition temperature of −60° to −90° C.

11. A rubber composition according to claim 4, wherein the random copolymer A has a glass transition temperature of −10° to 10° and the random copolymer B has a glass transition temperature of −60° to −90° C.

12. A vulcanizate obtained by vulcanizing a rubber composition comprising:
   a random copolymer A obtained by copolymerization of a conjugated diene and an aromatic vinyl compound using an alkali metal-based catalyst, said random copolymer A having
   (1) an aromatic vinyl compound content of 30% by weight or more,
   (2) a 1,2-vinyl content in conjugated diene units of 45% by weight or more, and
   (3) a glass transition temperature of −20° C. or higher;
   a random copolymer B obtained by copolymerization of a conjugated diene and an aromatic vinyl compound using an alkali metal-based catalyst, said random copolymer B having
   (a) an aromatic vinyl compound content of 30% by weight or less, and
   (b) a 1,2-vinyl content in conjugated diene units of 20% by weight or less, and
   (c) a glass transition temperature of −50° C. or lower; and
   a block copolymer C composed of random copolymer segment A and random copolymer segment B obtained by block copolymerization of a conjugated diene and an aromatic vinyl compound using an alkali metal-based catalyst, said random copolymer segment A having
   an aromatic vinyl compound content of 30% by weight or more,
   a 1,2-vinyl content in conjugated diene units of 45% by weight or more, and a glass transition temperature of −20° C. or higher,
said random copolymer segment B having
an aromatic vinyl compound content of 30% by weight or less,
a 1,2-vinyl content in conjugated diene units of 20% by weight or less, and
a glass transition temperature of −50° C. or lower;
wherein said rubber composition comprises:

90–50% by weight of a 20–80:80–20 mixture (I), by weight ratio, of said random copolymer A and said random copolymer B, and 10–50% by weight of said block copolymer C (II).

13. A tire tread comprised of the vulcanizate according to claim 12.

* * * * *